(No Model.)
W. C. EBERHARDT.
MILK COOLER.
No. 479,494.  Patented July 26, 1892.
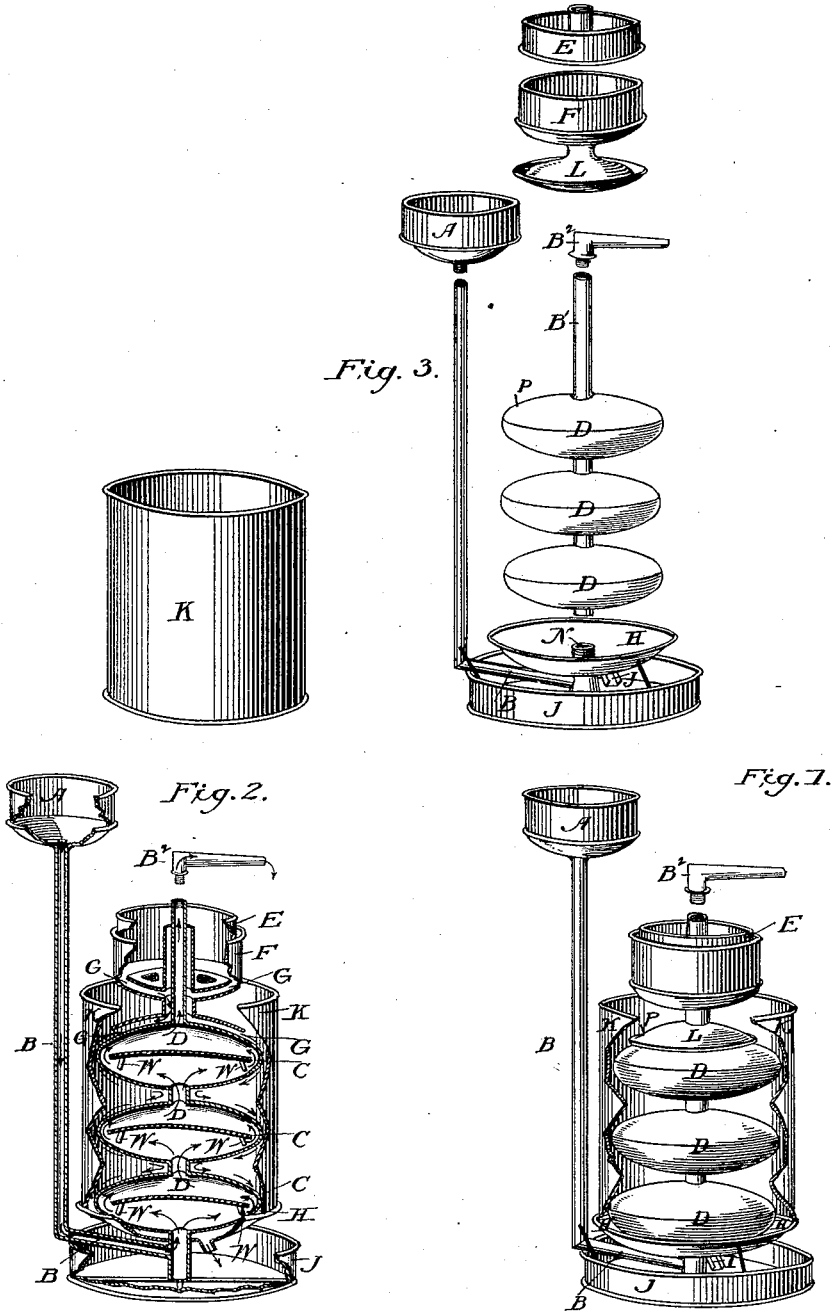

UNITED STATES PATENT OFFICE.

WILLIAM C. EBERHARDT, OF PLYMOUTH, WISCONSIN.

MILK-COOLER.

SPECIFICATION forming part of Letters Patent No. 479,494, dated July 26, 1892.

Application filed September 18, 1891. Serial No. 406,162. (No model.)

*To all whom it may concern:*

Be it known that I, WILLIAM C. EBERHARDT, a resident of Plymouth, in the county of Sheboygan, State of Wisconsin, have invented a new and useful Apparatus for Cooling Milk; and I do hereby declare that the following is a full, clear, and exact description of the invention, which will enable others skilled in the art to which it appertains to make and use the same, reference being had to the accompanying drawings, which form a part of this specification, and in which—

Figure 1 is a view of my cooler complete with casing broken. Fig. 2 is a vertical section of the essential parts of the cooling apparatus, and Fig. 3 is the cooler in sections.

The same letters refer to corresponding parts in all figures.

My invention is an apparatus for cooling milk; and it consists of parts which will hereinafter be more fully described.

In the accompanying drawings, A is the water-tank, resting on the tube B, which conveys the water to the cooler. D are hollow chambers through which the cold water ascends and over the outside of which the milk flows from the strainer E during the process of cooling.

C are horizontal sheets, which act as spreaders of the water in its ascent through the chambers D.

W are braces by which the horizontal sheets C are attached to the sides of chambers D. By them the water is made to rise along the internal surface. E is the strainer. F is the case inclosing the strainer. F, P, and L cause the milk to spread over the surface of the uppermost cooling-chamber. That part of the tube which conducts the water from the cooler to the pipe $B^2$ above is inside of $B'$.

G is the space between the strainer, tube, and upper cooling-chamber on the one side and the case on the other. Through the space G the milk runs onto the cooler.

H is a basin into which the milk runs from the cooler and from which milk is led through the trough I into the case.

J is a band or sleeve with open top and bottom, made to fit the neck of a milk-can. The whole is adapted to rest on a can which is to contain the cooled milk. By a glance at Fig. 3 it will be seen that the whole can be separated into parts convenient for cleaning.

In cooling, the milk is poured into the strainer E, from which it passes through the space G onto the surface of the uppermost cooling-chamber. The milk, being thinly spread over the surface chamber, adheres to it and follows it down to the second, where it likewise spreads over the surface, and, as in the first case, adheres until it reaches the next chamber. The milk flows on until it reaches the basin directly underneath the lowest chamber and passes into the can below. While the milk is flowing over the surface of the chambers D cold water from the tank A is conveyed to the cooling apparatus and has its exit from the tube $B^2$ above the strainer. The water may flow continuously during the cooling process, and the part to which the milk has imparted more of its warmth rises to the top in accordance with a well-known law of nature and passes off first. In its passage through the chambers the water is forced to the inner surface by the horizontal sheets C, thus bringing the cold water in contact with the surface and more effectually cooling the external surface over which the milk flows. The elevation of the water-tank above the remainder of the apparatus causes the water to rise in the chambers.

Having thus described my invention, I claim and desire to secure by Letters Patent of the United States—

The milk-cooler consisting of a series of connecting-chambers on the inside of which are horizontal plates or sheets secured by braces to the side of the chambers and having a narrow space between them and the inner surface of the chambers, a case inclosing the strainer and extending over the upper side of the top chamber, a water-tank connected by a tube with the lowest chamber, and a cylindrical outer case extending above the cooling-chambers, the whole resting on a base adapted to be fitted upon a milk-can, as set forth.

In testimony that I claim the foregoing as my own I have hereunto affixed my signature in presence of two witnesses.

WILLIAM C. EBERHARDT.

Witnesses:
BYRON A. GAFFRON,
ARTHUR A. H. BORGES.